United States Patent Office 3,372,136
Patented Mar. 5, 1968

3,372,136
DISPERSED TETRAFLUOROETHYLENE - HEXA-
FLUOROPROPYLENE COPOLYMER BASED
COATING COMPOSITIONS
Yutaka Kometani, Hyogo-ken, and Akira Yamada and
Soichi Satoyama, Takatsuki-shi, Japan, assignors to
Daikin Kogyo Kabushiki Kaisha, Osaka-shi, Japan, a
juridical person of Japan
No Drawing. Filed Oct. 21, 1965, Ser. No. 500,364
13 Claims. (Cl. 260—33.8)

ABSTRACT OF THE DISCLOSURE

Coating compositions of a tetrafluoroethylene—hexafluoropropylene copolymer dispersed in a solution of a polymer containing chlorotrifluoroethylene dissolved in a flurine containing organic solvent.

This invention relates to tetrafluoroethylene-hexafluoropropylene copolymer coating compositions. More particularly, the invention pertains to tetrafluoroethylene-hexafluoropropylene copolymer coating compositions yielding in a single coat a relatively thick and crackless film.

The tetrafluoroethylene-hexafluoropropylene copolymers are useful resins excelled in heat-resistance, dielectric properties and anti-chemical resistance. Said copolymers are employed in the art as a coating composition in the form of an aqueous suspension or a dispersion to impart a continuous film to the surface of the substrate.

In forming a crack-free, continuous film onto the surface of the substrate, however, the sintered film thickness obtainable from a single coat ranges at most from 0.005 to 0.015 millimeter. Thicker coatings produce cracks during the course of sintering procedure, and the mud cracks tend to develop, instead of disappearing, when baked or sintered. It is accordingly imperative to confine the sintered film thickness from a single coat to said range of from 0.005 to 0.015 millimeter, and this procedure requires a high degree of advanced technique and skill. The film thus obtained, further, is so poor in thickness and durability that the coating, drying and sintering procedures must be repeated to produce a film for practical use.

One object of this invention is accordingly to provide coating compositions which do not produce nor develop cracks even when applied in a single coat at a sintered film thickness above the order of from 0.005 to 0.015 millimeter which is the critical range of sintered film thickness for conventional tetrafluoroethylene-hexafluoropropylene copolymer coating compositions in a single coat.

Another object of the invention is to provide coating compositions which yield in a single coat a crackless film having a sintered film thickness running to the range of from 0.05 to 0.07 millimeter, so that the coating, drying and sintering procedures can be performed without repeating or with a minimal need of repetition.

A further object of the invention is to provide articles with a relatively thick crackless film of the tetrafluoroethylene-hexafluoropropylene copolymer coating composition of this invention.

The above and other objects which will become apparent in view of the following are accomplished by a composition (hereinafter called "Composition A") having finely pulverized particles of a tetrafluoroethylene-hexafluoropropylene copolymer dispersed in a solution of a chlorotrifluoroethylene-containing polymer. Alternatively, said objects can be materialized by a composition (hereinafter called "Composition B") having a thermoplastic resin incorporated into Composition A.

Either form of Compositions A and B yields in a single coat a crackless continuous film having a sintered film thickness reaching from 0.05 to 0.07 millimeter, namely, a thickness from 5 to 10 times the critical range of the conventional tetrafluoroethylene-hexafluoropropylene copolymer coating compositions in a single coat. For the coating compositions of this invention produce no cracks even during the drying and the subsequent sintering procedure.

The term "chlorotrifluoroethylene-containing polymer" employed in this invention and in the appended claims includes not only homopolymers of chlorotrifluoroethylene but copolymers consisting of chlorotrifluoroethylene in the order of more than 50 percent by weight and other substances copolymerizable therewith, such as vinylidene fluoride, tetrafluoroethylene, hexafluoropropylene or ethylene.

The aforesaid chlorotrifluoroethylene-containing polymer is solid at room temperature, having more than several tens of thousands of molecular weight, particularly from 40,000 to 100,000. The molecular weight of said polymer, however, is not confined to said order and can be selected from a wider range. For intance, such chlorotrifluoroethylene homopolymers as having a solution viscosity at 130° C. of from 0.5 to 1.2 centistoke in the order of 0.5 percent by weight in 2,5-dichlorobenzotrifluoride display no inconvenience for use of this invention and can be employed advantageously.

The chlorotrifluoroethylene content present in said chlorotrifluoroethylene-containing polymers ranges from 50 to 100 percent by weight, and there are produced no adverse effects, insofar as the chlorotrifluoroethylene is present in the order of more than 50 percent by weight. For instance, a copolymer comprising from 95 to 50 percent by weight of chlorotrifluoroethylene and from 5 to 50 percent by weight of tetrafluoroethylene is advantageously employed without any adverse effect. The chlorotrifluoroethylene-containing polymers employed in this invention are homopolymers of chlorotrifluoroethylene, copolymers of from 95 to 50 percent by weight of chlorotrifluoroethylene and from 5 to 50 percent by weight of tetrafluoroethylene, and copolymers of from 99 to 75 percent by weight of chlorotrifluoroethylene and from 1 to 25 percent by weight of vinylidene fluoride, of which homolymers of chlorotrifluoroethylene are most desirable.

The chlorotrifluoroethylene-containing polymer solution includes not only a solution in which a chlorotrifluoroethylene polymer is completely dissolved but a homogeneous colloidal dispersion wherein said cholorotrifluoroethylene-containing polymer is partially dissolved and the remaining portion is dispersed in the form of particles of less than 10 microns in diameter. Said chlorotrifluoroethylene-containing polymer solution is generally viscous, although the viscosity depends upon the species of the solvent employed.

The solvent employed in preparing said chlorotrifluoroethylene-containing polymer solution includes fluorine-containing organic solvents having affinity and a sufficient solubility for said chlorotrifluoroethylene-containing polymer, such as low molecular weight polymers of chlorotrifluoroethylene having an average molecular weight of from 500 to 2,000, 1,1,3-trifluoropentachloropropane, 2,5-dichlorobenzotrifluoride or o-chlorobenzotrifluoride. Of said solvents, low molecular weight polymers of chlorotrifluoroethylene of a molecular weight of from 500 to 2,000 produce the most desirable effects. Within said range of molecular weight, said polymer is of an oily or a paste or waxy state, so that there can be prepared a coating composition in the state of oil, paste or wax.

The chlorotrifluoroethylene-containing polymer solution is prepared at an elevated temperature, usually at from 100° to 250° C. The concentration of the chlorotrifluoroethylene-containing polymer in the solution is not necessarily high and is usually sufficient in the order of less than 10 percent by weight, preferably from 0.1 to 10 percent by weight, particularly from 0.5 to 5 percent by weight for best results.

The polymerization ration of the tetrafluoroethylene-hexafluoropropylene copolymers to be employed in this invention varies in accordance with the desired qualities of the resultant films. The most desirable copolymer is of a melt flow viscosity of from $1.0 \times 10^3$ to $1.0 \times 10^7$ poise, particularly from $1.0 \times 10^4$ to $5 \times 10^5$ poise, consisting of tetrafluoroethylene in the range of from 95 to 70 percent by weight, preferably from 90 to 75 percent by weight, and hexafluoropropylene in the order of from 5 to 30 percent by weight, preferably from 10 to 25 percent by weight. In determining said melt viscosity, the polymer to be tested is filled in a cylinder, 11.3 millimeters in internal diameter and held at 380° ± 0.5° C. After maintaining at said temperature for further 5 minutes, the content is extruded through an orifice, 2.20 millimeters in internal diameter and 8.00 millimeters long, under a piston load of 5,000 grams per cm.² Constant 53.15 is then divided by the resultant extruding rate (gram/minute) to determine the poise of the copolymer being tested.

The tetrafluoroethylene-hexafluoropropylene copolymer is desirably used in fine particles having a diameter in the order of 10 microns or less, preferably 1 micron or less. The particles obtained by emulsion polymerization are of from 0.1 to 0.8 micron in diameter, so that said particles are most desirable for this invention. Such particles can also be prepared by pulverizing the polymers obtained by the other conventional polymerization method.

Composition A of this invention is prepared by dispersing fine particles of a tetrafluoroethylene-hexafluoropropylene copolymer in a fluorine-containing solvent solution of a chlorotrifluoroethylene-containing polymer. The resultant composition is usually of a paste state at normal room temperature, but the composition turns into an oily or a waxy state in accordance with the solid content present in the composition and the species of the fluorine-containing organic solvent employed. The amount of the tetrafluoroethylene-hexafluoropropylene copolymer content present in the composition is a vital factor, because excess tetrafluoroethylene-hexafluoropropylene copolymer in the composition yields mud cracks during the sintering procedure, making it impossible to produce a crackless film in a single coat. In practice, no cricks are formed insofar as the tetrafluoroethylene-hexafluoropropylene copolymer is present in the order of 40 percent by weight or less. The desirable amount of tetrafluoroethylene-hexafluoropropylene copolymer present in the composition ranges from 5 to 40 percent by weight, particularly from 15 to 35 percent by weight, although the amount depends upon the use of the resultant article.

The desirable method of preparing Composition A comprises mixing an aqueous emulsion of said tetrafluoroethylene-hexafluoropropylene copolymer with the fluorine-containing solvent solution of a chlorotrifluoroethylene-containing polymer to convert the aqueous emulsion to an oily dispersion, and then removing by separation the aqueous phase from the oily dispersion. The tetrafluoroethylene-hexafluoropropylene copolymer may also be used in the state of a dispersion dispersed in an organic liquid medium such as acetone or carbon tetrachloride. In this case, said tetrafluoroethylene-hexafluoropropylene copolymer is dispersed in said organic liquid medium in a state of dried minute particles, and the chlorotrifluoroethylene-containing polymer solution is admixed therewith. The organic solvent employed is driven off, where necessary, by evaporation with heat or by other suitable method.

Composition B of this invention incorporates into Composition A a thermoplastic resin and a solvent therefor. One advantage of this composition is that the order of concentration of the tetrafluoroethylene-hexafluoropropylene copolymer in relation to the fluorine-containing solvent solution of a chlorotrifluoroethylene-containing polymer can be markedly raised as compared with Composition A, so that there can be produced crackless homogeneous films from a single coat even when said tetrafluoroethylene-hexafluoropropylene copolymer is employed in the order of 90 percent by weight or thereabout on the basis of the combined weight of the tetrafluoroethylene-hexafluoropropylene copolymer and the fluorine-containing solvent solution of a chlorotrifluoroethylene-containing polymer. This composition is accordingly very desirable from the economic points of view.

The thermoplastic resins to be employed in this invention must have an ability to form a continuous film when the composition containing said resin is dried. The decomposition temperature of said thermoplastic resins should be equivalent to or not higher than the melting point of the tetrafluoroethylene-hexafluoropropylene copolymer to be employed therewith, namely, a temperature ranging from 290° to 400° C. in general. And the solvent for said thermoplastic resins should have an affinity for the fluorine-containing organic solvent to be employed therewith.

Such thermoplastic resins to be employed in this invention include polymethylmethacrylate, polyalphamethylstyrene, polystyrene, polybutadiene, and copolymers of styrene and the resins polymerizable therewith, such as acrylonitrile, alphamethylstyrene or butadiene. These resins are employed either singly or in combination of 2 or more species.

The organic solvents to be employed for dissolving said thermoplastic resins are carbon tetrachloride, xylene, toluene, acetone, cyclohexanone, diisobutyl ketone and the like. Said solvents are employed either singly or in combination of 2 or more species. Besides dissolving the thermoplastic resin, said solvent works as a means for controlling the viscosity of the resultant coating composition.

In incorporating said thermoplastic resin into Composition A of this invention, the thermoplastic resin is first dissolved in said solvent and then the solution is dispersed in said Composition A. Alternatively, the thermoplastic resin and the solvent therefor may be separately added to Composition A, and then the mixture is homogeneously ball-milled. One advantage of the former procedure is that there can be eliminated the time and labor required for the ball-milling to be employed in the latter procedure.

In the resultant Composition B, the tetrafluoroethylene-hexafluoropropylene copolymer content can be raised, as stated before, to the order of 90 percent by weight on the basis of the combined weight of the tetrafluoroethylene-hexafluoropropylene copolymer and the fluorine-containing polymer, enabling Composition B to reduce the amount of the relatively expensive chlorotrifluoroethylene-containing polymer and the fluorine-containing solvent therefor which must be driven off during the sintering procedure, so that Composition B containing a thermoplastic resin as specified before is more profitable from the economic points of view.

The desirable amount of tetrafluoroethylene-hexafluoropropylene copolymer to be employed in this invention ranges from 5 to 90 percent by weight, preferably 40 to 90 percent by weight. And the amount of the thermoplastic resin to be employed therewith ranges from 5 to 100 parts by weight, preferably from 10 to 30 parts by weight, in relation to said tetrafluoroethylene-hexafluoropropylene copolymer as 100 parts, although there may be variations in accordance with the species of the thermoplastic resin to be employed.

The amount of the solvent to be employed for dissolving the thermoplastic resin can be reduced to the extent where said thermoplastic resin can be sufficiently dissolved in Composition A. The range of said amount further varies in accordance with the species of the components and the ways of application of the resultant coating composition. To prepare a composition of a high order of viscosity for doctor-knife coating or roll coating, for instance, excess solvent must be avoided; and to prepare a composition of a low order of viscosity for spray coating or dipping, said solvent must be employed in a large amount.

The coating composition of this invention is applied to the substrate by coating, dipping, spraying or any of other suitable methods, and the article is dried and sintered, where necessary, according to the conventional method. The coating composition suitable for roll coating or doctor-knife coating is of a paste state at a normal room temperature. For this purpose, either form of Compositions A and B is profitably employed wherein the solvent for the thermoplastic resin is employed in an amount suitable for maintaining the composition in a paste state. Compositions suitable for dipping or spraying are liquid compositions prepared by diluting Composition A with a diluent having affinity for the fluorine-containing solvent employed, such as carbon tetrachloride, xylene, toluene, acetone, cyclohexanone or diisobutyl ketone. Composition B wherein the solvent for the thermoplastic resin is employed in a sufficient amount to keep the composition in a liquid state is also suitable for dipping and spraying. The amount of said diluent or solvent varies with the amount and the species of the components of the coating composition being prepared, preferably in the order of 3 times the combined weight of the original components of Composition A or B from economic points of view.

Drying procedure is applied in this invention to those coatings or films resulting from the compositions wherein the aforesaid diluent or solvent for the thermoplastic resin is employed. In this case, drying is carried out at a temperature sufficiently high for dispelling the diluent or the solvent employed. There are diluents and solvents which do not need heat-drying and can be dispelled at normal room temperature. In this case, no drying procedure is applied. There is further no need of applying drying to those coatings or films resulting from Composition A where no diluent is employed.

Sintering is applied in this invention at a temperature equivalent to or higher than the melting point of the tetrafluoroethylene-hexafluoropropylene copolymer employed. The coating prepared is heated at a temperature high enough to evaporate the fluorine-containing solvent, to decompose the chlorotrifluoroethylene-containing polymer and the thermoplastic resin admixed, and to sufficiently sinter the tetrafluoroethylene-hexafluoropropylene copolymer content. The sintering temperature is accordingly dependent upon the species of the components of the composition employed, normally ranging from 290° to 400° C., preferably from 320° to 380° C. By such sintering procedure, a continuous crackless film of a tetrafluoroethylene-hexafluoropropylene copolymer is formed onto the surface of the substrate.

The film obtained from Composition A or B of this invention consists of the employed tetrafluoroethylene-hexafluoropropylene alone, containing no impurities. And this fact is clearly acknowledged by the infrared absorption spectrum analysis. The film further is completely free from cracks, having a sintered film thickness from 5 to 10 times the crack-free film thickness obtained from a single coat by sintering a conventional tetrafluoroethylene-hexafluoropropylene dispersion coating. And the maximal sintered film thickness from a single coat of the coating composition of this invention eventually reaches 0.07 millimeter. Occasionally, however, bubbles are formed in the coatings or films where the sintered film thickness from a single coat exceeds 0.06 millimeter. The profitable and desirable sintered film thickness form a single coat in this invention is accordingly in the order of 0.05 millimeter or thereabout. To obtain a thicker coating or film, therefore, the coating, drying and sintering procedures must be repeated. But it is apparent that such repetition can be profitably avoided, because the principles of this invention permit to form an exceedingly thick coating or film for practical use from a single coat, as stated before.

The crackless articles produced according to the principles of this invention are employed as useful materials for securing resistance against heat, corrosion, cohesion or friction. When the film is prepared by separating from the substrate, there is obtained a continuous cast film. In preparing a coated article, it is desirable to apply to the substrate a primer, such as "Polyflon," a tetrafluoroethylene resin primer manufactured by Daikin Kogyo Kabushiki Kaisha, Osaka, Japan, prior to the coating of the composition of this invention.

For a better understanding of the principles of this invention, there are disclosed in the following the preferred examples in which all parts and percentages are by weight:

*Example 1*

In 100 parts of a mixture having a viscosity of 350 cp. at 50° C. and consisting of 2 species of low molecular weight chlorotrifluoroethylene of an average molecular weight of 900 and 1,100 respectively were homogeneously dispersed 2.5 parts of a high molecular weight chlorotrifluoroethylene polymer having a solution viscosity of 0.68 cs. at 130° C. in 2,5-dichlorobenzotrifluoride at a concentration of 0.5 percent. The resultant mixture was heated at 150° to 165° C. until the mixture turned transparent, producing a viscous dispersion medium having a viscosity of 21,000 cp. at 100° C.

In 60 parts of carbon tetrachloride, on the other hand, were dispersed with stirring 30 parts of the tetrafluoroethylene-hexafluoropropylene copolymer particles prepared by dispersion polymerization and having an average particle size of 0.7 micron in diameter and a melt flow viscosity of $14.8 \times 10^4$, the hexafluoropropylene content in said copolymer being in the order of 12.44 percent.

To the dispersion of the resultant tetrafluoroethylene-hexafluoropropylene copolymer prepared by dispersing in carbon tetrachloride were added portionwise 70 parts of the aforesaid dispersion medium, and the mixture was heated with stirring at about 80° C. to dispel the carbon tetrachloride employed.

The resultant homogeneous paste composition consisting of the aforesaid dispersion medium and finely divided particles of the tetrafluoroethylene-hexafluoropropylene copolymer was applied in a single coat by a glass stick to a chromium-plated 2 millimeter-thick stainless steel plate in such a manner as to form a layer of a thickness gradually increasing from one side-edge portion to the other. The article was then sintered for 20 minutes in an electrically heated oven at 380° C. and cooled at normal room temperature, and the sintered coating was separated from the plate, producing a continuous cast film having a uniformly increasing thickness of 0.01 millimeter at one side-edge portion and 0.08 millimeter at the other.

The film thus obtained showed no traces of cracking and of peeling off. The film was transparent up to the 0.05 millimeter thick area. The 0.06 millimeter thick area yielded no cracks but more or less bubbles. Infrared absorption spectrum analyses revealed that the film was entirely identical to the tetrafluoroethylene-hexafluoropropylene copolymer film prepared by the conventional melt-extrusion process.

Example 2

40 parts of the paste composition of Example 1 were diluted with stirring with 60 parts of a 1:1 weight ratio mixture of xylene and cyclohexanone. The resultant composition which was of a liquid state at normal room temperature and had a viscosity of 45 cp. at 25° C. was applied by spraying through a 1.1 millimeter in internal diameter nozzle under a pressure of 3.0 kg./cm.$^2$ to a chromium-plated stainless steel plate. The article was then dried at normal room temperature for 30 minutes, sintered at 360° C. for 30 minutes, and cooled in cold water. The coating thus prepared was separated from the substrate, producing a transparent cast film which was 0.04 millimeter thick and showed no traces of cracking and bubbling. The results of the tension test performed were as follows:

Yield strength _____kg./mm.$^2$__ 1.49
Ultimate tensile strength _____kg./mm.$^2$__ 2.00
Elongation _____percent__ 300

Said tension test was performed by pulling a Japanese Industrial Standard K-6301 No. 3 dumbbell specimen at a rate of 100 millimiters per minute at 23° C.

Example 3

In a 100 parts of a mixture having a viscosity of about 50 cp. at 50° C. and consisting of 2 species of low molecular weight chlorotrifluoroethylene polymers of an average molecular weight of 900 and 1,100 respectively were homogeneously dispersed 4.4 parts of a high molecular weight chlorotrifluoroethylene having a solution viscosity of 0.8 cs. at 130° C. in 2,5-dichlorobenzotrifluoride at a concentration of 0.5 percent. The mixture was heated at 150° to 165° C. until said high molecular weight chlorotrifluoroethylene polymer turned transparent, producing a viscous dispersion medium of a viscosity of 100,000 cp. at 100° C.

In a mixture of 16 parts of tetrafluoroethylene-hexafluoropropylene copolymer particles of Example 1 and 16 parts of a 1:1 weight ratio mixture of xylene and diisobutyl ketone were homogeneously dispersed 24 parts of the aforesaid dispersion medium added portionwise. There were further added 44 parts of a 1:1 weight ratio mixture of xylene and diisobutyl ketone, and the mixture was thoroughly mixed, producing a homogeneous coating composition of a viscosity of 200 cp. at 25° C.

The composition thus prepared was applied by spraying through a 1.1 millimeter in internal diameter nozzle under an air pressure of 3.0 kg./cm.$^2$ to an aluminum plate which was pretreated with the polytetrafluoroethylene primer disclosed in U.S. Patent 2,562,118. The plate was then dried for 30 minutes at room temperature and for further 30 minutes in a ventilating dessicator at 50° C., sintered at 380° C. for 30 minutes, and cooled in cold water.

Examination of the resultant coating with a pinhole tester which was tradenamed "Tesla Coil" and manufactured by Tokyo Koshuha Denkiro Kabushiki Kaisha, Tokyo, Japan, showed that the insulation was complete, that there were formed no pinholes in the coating, and that the coating of the tetrafluoroethylene-hexafluoropropylene copolymer coating composition employed was inseparably fused with the film of the primer employed, forming an ideal adhesive coating onto the aluminum substrate.

Example 4

In a mixture having a viscosity of 650 cp. at 50° C. and consisting of 27 parts of 2,5-dichlorobenzotrifluoride and 70 parts of a low molecular weight chlorotrifluoroethylene of an average molecular weight of 1,100 were homogeneously mixed 3 parts of a 96:4 weight ratio chlorotrifluoroethylene - vinylidene chloride copolymer having a flow velocity of $15 \times 10^{-2}$ cc./sec. The mixture was then heated with stirring at 130° to 140° C. for 10 minutes, producing a dispersion medium in the state of a translucent gel.

Said flow velocity was determined in the following manners: 2 grams of the resin to be determined were filled in a cylinder, 11.3 millimeters in internal diameter, at 230° C. After keeping at said temperature for 10 minutes, the content was extruded through an orifice, 1 millimeter in internal diameter and 1 millimeter long, under a piston load of 100 kg./cm.$^2$ for the flow velocity, namely, the amount of the copolymer extruded per second.

70 parts of the dispersion medium thus prepared and 30 parts of tetrafluoroethylene-hexafluoropropylene copolymer of Example 1 were homogeneously mixed as in Example 1. The resultant paste composition was applied in a single coat with a doctor knife to a chromium-plated stainless steel plate in such a manner as to form a layer having a thickness uniformly increasing from the one side-edge portion to the other. The plate was then sintered at 390° C. for 60 minutes, cooled at room temperature, and the coating was separated from the substrate, producing a cast film having a uniformly increasing thickness of 0.01 millimeter at one side-edge portion and 0.05 millimeter at the other.

The film thus obtained showed no traces of cracking and of peeling off during the coating, drying and sintering procedures and was transparent and excelled in durability. Infrared absorption spectrum analyses showed the complete identity of the film to the tetrafluoroethylene-hexafluoropropylene copolymer film prepared by the conventional melt extrusion process.

Examples 5–8

In Examples 5 to 8 were employed the following components:

(A) A 30 percent aqueous dispersion of a 79.6:20.4 weight ratio hexafluoropropylene-tetrafluoroethylene copolymer having a melt viscosity of $21.7 \times 10^4$ poise and an average particle size of 0.2 micron in diameter;

(B) Viscous dispersion medium obtained in the state of a gel by homogeneously mixing at room temperature 97.5 parts of low molecular weight chlorotrifluoroethylene polymer having an average molecular weight of 1,000 with 2.5 parts of high molecular weight chlorotrifluoroethylene polymer having a solution viscosity of 0.68 cs. at 130° C. at a concentration of 0.5 percent in 2,5-dichlorobenzotrifluoride and by heating the mixture with stirring at 150° C. for 5 minutes;

(C) Thermoplastic resins:

(C-1) Amoco Resin 18-240 (Amoco Chemicals Corporation, Chicago, U.S.A.);
(C-2) Amoco Resin 18-290 (same as above);
(C-3) Acrypet S (Mitsubishi Rayon Kabushiki Kaisha, Tokyo, Japan);
(C-4) Acrypet M (same as above);

Said Amoco resins, according to the specification, being alphamethyl styrene polymer pellets of 2 millimeters in diameter and the ring and ball softening point in terms of ASTM-D569-42T being 115.5° C. for Amoco Resin 18-240 and 143.3° C. for Amoco Resin 18-290; and said Acrypets, on the other hand, being methylmethacrylate polymer pellets of 3 millimeters in diameter and the ring and ball softening point in terms of ASTM-D567-48 being 125° C. for Acrypet S and 145° C. for Acrypet M; and (D) Solvent for thermoplastic resins C being a mixture of 100 parts of cyclohexanone and 50 parts of xylene.

To 100 parts of the aforesaid tetrafluoroethylene-hexafluoropropylene copolymer aqueous dispersion A were added 30 parts of acetone and 20 parts of the aforesaid viscous dispersion medium B, and the mixture was violently stirred for 30 minutes. After allowing the tetrafluoroethylene-hexafluoropropylene copolymer to be homogeneously dispersed in said dispersion medium B, the upper layer of water and acetone was separated, and the resultant paste composition was dried at 70° C. for 60 minutes under reduced pressure to completely dispel the water. The composition thus prepared was ball-milled for 5 hours with the solution of each of said thermoplastic resins C prepared by dissolving at 50° C. in the aforesaid solvent D in the order of concentrations as specified in Table 1. The compositions thus prepared were tested with the "BL Viscometer," Tokyo Keiki Seisakusho Kabushiki Kaisha, Tokyo, Japan, for respective viscosity as shown in Table 1.

TABLE 1

| Example | Components in parts | | | | | | | Viscosity in cp. at 25° C. |
|---|---|---|---|---|---|---|---|---|
| | A | B | C | | | | D | |
| | | | C-1 | C-2 | C-3 | C-4 | | |
| 5 | 100 | 20 | 9 | | | | 66 | 1,500 |
| 6 | 100 | 20 | | | 6 | | 69 | 1,000 |
| 7 | 100 | 20 | | | 4.5 | 4.5 | 66 | 1,700 |
| 8 | 100 | 20 | | 3 | 3 | | 69 | 880 |

N.B.—Components A, B, C-1, C-2, C-3, C-4 and D are all as specified hereinbefore.

Each composition as specified in Table 1 was then sprayed in a single coat through a 1.1 millimeter in internal diameter nozzle onto a 1.5 millimeter thick plate in such a manner as to form a layer of a thickness gradually increasing from one side-edge portion to the other. The plate was then dried at 100° C. with infrared rays, sintered at 380° C. in an electrically heated oven for 40 minutes, and cooled in cold water, producing a coating having a uniformly increasing thickness of 0.01 millimeter at one side-edge portion and 0.07 millimeter at the other.

The coating thus obtained exhibited no traces of damping or of uneven thickness throughout the layer. There were observed no traces of cracking and of peeling off after drying, and the coating after sintering was transparent. Infrared absorption spectrum analyses of each film separated from the substrate by dissolving off the aluminum with concentrated hydrochloric acid showed no traces of impurities and the complete identity to the tetrafluoroethylene-hexafluoropropylene copolymer film prepared by the conventional melt-extrusion procedure from pellets. Other findings were as follows:

TABLE 2

| Example | Bubbles | Pinholes | Tension test | | |
|---|---|---|---|---|---|
| | | | Yield strength | Ultimate tensile strength | Elongation |
| 5 | No traces in areas up to 0.08 mm. thick. | No traces in areas more than 0.04 mm. thick. | 1.40 | 2.0 | 300 |
| 6 | ----do---- | ----do---- | 1.52 | 2.3 | 350 |
| 7 | No traces in areas up to 0.07 mm. thick. | ----do---- | 1.49 | 2.4 | 400 |
| 8 | ----do---- | ----do---- | 1.50 | 2.1 | 310 |

The tensile strength test in Table 2 was performed by pulling at the rate of 100 millimeters per minute at 23° C. a Japanese Industrial Standard K-6301 dumbbell specimen stamped out from the 0.04 to 0.05 millimeter thick areas of the separated films. The resultant values were almost identical to those of the tetrafluoroethylene-hexafluoropropylene copolymer film prepared by the conventional melt-extrusion process from pellets.

*Example 9–11*

In Examples 9 to 11 were employed the following components:

(A) Tetrafluoroethylene-hexafluoropropylene copolymer:

(A-1) Tetrafluoroethylene-hexafluoropropylene copolymer dispersion as employed in Examples 5 to 8;
(A-2) Tetrafluoroethylene-hexafluoropropylene copolymer particles prepared by coagulating an aqueous dispersion of a 87.6:12.4 weight ratio tetrafluoroethylene-hexafluoropropylene copolymer having a melt flow viscosity of $14.8 \times 10^4$ poise and an average particle size of 0.7 micron as determined by the particle surface area measuring apparatus made by Shimazu Seisakusho, Tokyo, Japan;

(B) Viscous dispersion medium as employed in Examples 5 to 8;
(C) Thermoplastic resin: Amoco Resin 18–240 as employed in Examples 5 to 8; and
(D) Solvent for thermoplastic resin as employed in Examples 5 to 8.

The compositions of Examples 9 and 11 were prepared in the same manners as described in Examples 5 to 8, except the composition of Example 11 in which tetrafluoroethylene-hexafluoropropylene particles A-2 were employed.

The composition of Example 11 was prepared in the following manner: 200 parts of tetrafluoroethylene-hexafluoropropylene copolymer particles A-2 were homogeneously mixed with 200 parts of acetone. There were then gradually added 40 parts of viscous dispersion medium B, and the mixture was heated with stirring to dispel the acetone employed. The resultant paste composition was ball-milled for 10 hours with thermoplastic resin C and solvent D added in amounts as shown in Table 3, producing a whitish composition in a state of paste. Viscosity values determined as in Examples 5 to 8 were as follows:

TABLE 3

| Example | Components in parts | | | | | Viscosity in cp. at 25° C. |
|---|---|---|---|---|---|---|
| | A | | B | C | D | |
| | A-1 | A-2 | | | | |
| 9 | 270 | | 19 | 24 | 2,554 | 840 |
| 10 | 133 | | 60 | 3.0 | 97 | 250 |
| 11 | | 200 | 40 | 18 | 82 | 100,000 |

Of said compositions, the compositions of Examples 9 and 10 were respectively applied in a single coat by spraying through a 1.1 millimeter in internal diameter nozzle to a 1.5 millimeter thick aluminum plate, and the composition of Example 11 was coated with a doctor knife onto a similar aluminum plate. Each of the plates was then dried at room temperature, sintered and cooled as described in Example 5, producing almost the same properties as shown in Examples 5 to 8.

Namely, all the cast films produced no traces of cracking and of peeling off during the drying procedure and showed uniform structure throughout the layers. Infrared absorption spectrum analyses and tensile strength tests revealed the complete identity of said films to the tetrafluoroethylene-hexafluoropropylene copolymer film prepared by melt extrusion from pellets.

*Examples 12–14*

In Examples 12 to 14 were employed the following components:

(A) Tetrafluoroethylene-hexafluoropropylene copolymer aqueous dispersion as employed in Examples 5 to 8;
(B) Viscous dispersion medium:

(B-1) A viscous dispersion medium obtained in the state of a transparent gel by homogeneously dispersing at room temperature in 97.5 parts of a low molecular weight chlorotrifluoroethylene polymer of an average molecular weight of 1,000 2.5 parts of 96:4 weight ratio chlorotrifluoroethylene-vinylidene fluoride copolymer having a flow velocity of $15 \times 10^{-2}$ cc./sec. which was determined as described in Example 4, and by heating the resultant mixture at 150° C. for 5 minutes;

(B-2) A viscous dispersion medium obtained in the state of a transparent gel by homogeneously mixing to the order of a viscosity of 350 cp. at 50° C. 50 parts each of two species of low molecular weight chlorotrifluoroethylene polymers having an average molecular weight or 900 and 1,100 respectively; by homogeneously dispersing at room temperature in 97.5 parts of the resultant mixture 2.5 parts of a high molecular weight chlorotrifluoroethylene as employed in Examples 5 to 8, and heating with stirring the resultant mixture at 165° C. for 5 minutes;

(B-3) A viscous dispersion medium obtained in the state of a transparent gel by homogeneously dispersing in a fluorine-containing organic solvent consisting of 50 parts of a low molecular weight chlorotrifluoroethylene polymer having an average molecular weight of 1,100 and 27 parts of 2,5-dichlorobenzotrifluoride 3 parts of the high molecular weight chlorotrifluoroethylene polymer as employed in Examples 5 to 8, and by heating with stirring the resultant mixture at 130° to 140° C. for 10 minutes;

(C) Thermoplastic resin: Acrypet S as employed in Examples 5 to 8; and (D) Solvent for thermoplastic resin: a 50:50:50 weight ratio mixture of cyclohexanone, diisobutyl ketone and toluene.

The above specified components were prepared into homogeneous emulsion compositions in a ratio as shown in Table 4, wherein viscosity was determined as in Example 4.

TABLE 4

| Example | Components in parts | | | | | | Viscosity in cp. at 25° C. |
|---|---|---|---|---|---|---|---|
| | A | B | | | C | D | |
| | | B-1 | B-2 | B-3 | | | |
| 12 | 100 | 20 | | | 9 | 66 | 1,100 |
| 13 | 100 | | 20 | | 9 | 66 | 1,700 |
| 14 | 100 | | | 20 | 9 | 66 | 1,300 |

Coatings prepared in the same manner as described in Example 5 from the compositions of Examples 12 to 14 exhibited almost the same physical properties as tetrafluoroethylene-hexafluoropropylene copolymer coatings prepared by melt extrusion from pellets.

In view of the foregoing, there may be made various changes and modifications in the embodiments of the principles of this invention. For instance, the employment of a surface active agent improves the fineness of the film or smoothness of the coating after sintering. There may be added fine particles of inorganic substances which do not deteriorate in quality at a temperature for sintering the tetrafluoroethylene-hexafluoropropylene copolymer employed, such as graphite, carbon black, glass, molybdenum disulfide or silicon oxide, to improve the mechanical and physical properties of the coating or film to be obtained. To impart a desired color to the coating or film, further, there may be added a pigment which does not change in quality when sintered, such as chromium trioxide, cadmium oxide, cadmium sulfide or titanium oxide. It is accordingly requested that the invention be interpreted rather broadly except otherwise stated in the appended claims.

What we claim is:

1. A coating composition which comprises from 95 to 60 parts by weight of a liquid dispersion medium, said dispersion medium being a solution of a chlorotrifluoroethylene-containing polymer in a fluorine-containing organic solvent, and from 5 to 40 parts by weight of tetrafluoroethylene-hexafluoropropylene copolymer dispersed in said dispersion medium, said chlorotrifluoroethylene-containing polymer being a solid at room temperature and containing at least 50 percent by weight of chlorotrifluoroethylene and selected from the group of polymers consisting of homopolymers of chlorotrifluoroethylene and copolymers of chlorotrifluoroethylene and a substance which is copolymerizable with said chlorotrifluoroethylene and selected from the group consisting of vinylidene fluoride, tetrafluoroethylene, hexafluoropropylene and ethylene, said fluorine-containing organic solvent being selected from the group consisting of a low molecular weight chlorotrifluoroethylene polymer having an average molecular weight of from 500 to 2,000, 1,1,3-trifluoropentachloropropane, 2,5-dichlorobenzotrifluoride and o-chlorobenzothrifluoride, and said tetrafluoroethylene-hexafluoropropylene copolymer having a melt flow viscosity of from $1.0 \times 10^3$ to $1.0 \times 10^7$ poise and comprising tetrafluoroethylene in the order of 95 to 70 percent by weight and hexafluoropropylene in the order of 5 to 30 percent by weight.

2. The coating composition of claim 1, wherein said tetrafluoroethylene-hexafluoropropylene copolymer comprises tetrafluoroethylene in the order of from 90 to 75 percent by weight and hexafluoropropylene in the range of from 10 to 25 percent by weight, and the melt flow viscosity of said tetrafluoroethylene-hexafluoropropylene copolymer is from $1.0 \times 10^4$ to $5 \times 10^5$ poise.

3. The coating composition of claim 1, wherein said tetrafluoroethylene-hexafluoropropylene copolymer is employed in the range of from 15 to 35 percent by weight.

4. The coating composition of claim 1, wherein said chlorotrifluoroethylene-containing polymer is a chlorotrifluoroethylene homopolymer having a solution viscosity of from 0.5 to 1.2 centistoke at 130° C. in 2,5-dichlorobenzothrifluoride at a concentration of 0.5 percent by weight.

5. The coating composition of claim 1, wherein said chlorotrifluoroethylene-conting polymer is dissolved in said organic solvent in the order of a concentration from 0.1 to 10 percent by weight.

6. The coating composition of claim 1, which is diluted to the order of at least 3 times the original weight of said composition with a diluent selected from the group consisting of carbon tetrachloride, xylene, toluene, acetone, cyclohexanone and diisbutyl ketone.

7. A coating composition which comprises from 95 to 10 parts by weight of a liquid dispersion medium, said dispersion medium being a solution of a chlorotrifluoroethylene-containing polymer in a fluorine-containing organic solvent; from 5 to 90 parts by weight of a tetrafluoroethylene-hexafluoropropylene copolymer dispersed in said dispersion medium; and a thermoplastic resin and a solvent therefor which are incorporated in the resultant dispersion respectively in the order of from 5 to 100 parts by weight in relation to said tetrafluoroethylene-hexafluoropropylene copolymer as 100 parts by weight and at most 3 times the original weight of said resultant dispersion, said thermoplastic resin being at least one member selected from the group consisting of polymethylmethacrylate, polyalphamethylstyrene, polystyrene, styrene-acrylonitrile copolymers, styrene-alphamethylstyrene copolymers, styrene-butadiene copolymers and polybutadiene, said solvent for said thermoplastic resin being a member selected from the group consisting of carbon tetrachloride, xylene, toluene, acetone, cyclohexanone and diisobutyl ketone, said chlorotrifluoroethylene-containing polymer being a solid at room temperature and containing at least 50 percent by weight of chlorotrifluoroethylene and selected from the group of polymers consisting of homopolymers of chlorotrifluoroethylene and copolymers of chlorotrifluoroethylene and a substance which is copolymerizable with said chlorotrifluoroethylene and selected from the group consisting of vinylidene fluoride, tetrafluoroethylene, haxafluoropropylene and ethylene, said fluorine-containing organic solvent being selected from the group consisting of a low molecular weight chlorotrifluoroethylene polymer having an average molecular weight of from 500 to 2,000, 1,1,3-trifluoropentachloropropane, 2,5-dichlorobenzotrifluoride and o-chlorobenzothrifluoride, and said tetrafluoroethylene-hexafluoropropylene copolymer having a melt flow viscosity of from $1.0 \times 10^3$ to $1.0 \times 10^7$ poise and comprising tetrafluoroethylene in the order of 95 to 70 percent by weight and hexafluoropropylene in the order of 5 to 30 percent by weight.

8. The coating composition of claim 7, wherein said tetrafluoroethylene-hexafluoropropylene copolymer is dispersed in said dispersion medium in the range of from 40 to 90 percent by weight.

9. The coating composition of claim 7, wherein said thermoplastic resin is incorporated in the order of from 10 to 30 parts by weight in relation to said tetrafluoroethylene-hexafluoropropylene copolymer as 100 parts by weight.

10. The coating composition of claim 7, wherein said chlorotrifluoroethylene-contining polymer is a chlorotrifluoroethylene homopolymer having a solution viscosity of from 0.5 to 1.2 centistokes at 130° C. in 2,5-dichlorobenzotrifluoride at a concentration of 0.5 percent by weight.

11. The coating composition of claim 7, wherein said tetrafluoroethylene-hexafluoropropylene copolymer comprises tetrafluoroethylene in the order of from 90 to 75 percent by weight and hexafluoropropylene in the range of from 10 to 25 percent by weight, and the melt flow viscosity of said tetrafluoroethylene-hexafluoropropylene copolymer is from $1.0 \times 10^4$ to $5 \times 10^5$ poise.

12. An article coated with the coating composition of claim 1.

13. An article coated with the coating of composition of claim 7.

References Cited

UNITED STATES PATENTS

| | | | |
|---|---|---|---|
| 2,866,721 | 12/1958 | Hetherington | 260—33.6 |
| 3,051,683 | 8/1962 | Mallouk | 260—890 |
| 3,054,761 | 9/1962 | Moore et al. | 260—900 |
| 3,303,154 | 2/1967 | Hirose et al. | 260—33.6 |

MORRIS LIEBMAN, *Primary Examiner.*

S. L. FOX, *Assistant Examiner.*